(12) United States Patent
Everhart et al.

(10) Patent No.: US 6,587,824 B1
(45) Date of Patent: Jul. 1, 2003

(54) SELECTIVE SPEAKER ADAPTATION FOR AN IN-VEHICLE SPEECH RECOGNITION SYSTEM

(75) Inventors: Charles Allen Everhart, Canton, MI (US); Scott Alan Thompson, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/565,304

(22) Filed: May 4, 2000

(51) Int. Cl.[7] .............................................. G10L 15/00
(52) U.S. Cl. ...................... 704/275; 704/243; 704/246
(58) Field of Search ................................ 704/275, 246, 704/234, 251, 256, 270, 272, 243, 244, 278, 255

(56) References Cited

U.S. PATENT DOCUMENTS

| | | | | |
|---|---|---|---|---|
| 4,509,133 A | * | 4/1985 | Monbaron et al. | 704/251 |
| 4,593,403 A | * | 6/1986 | Kishi et al. | 704/243 |
| 5,027,406 A | * | 6/1991 | Roberts et al. | 704/244 |
| 5,579,436 A | * | 11/1996 | Chou et al. | 704/244 |
| 5,706,399 A | * | 1/1998 | Bareis | 704/274 |
| 5,835,890 A | * | 11/1998 | Matsui et al. | 704/255 |
| 5,864,810 A | | 1/1999 | Digalakis et al. | |
| 6,205,426 B1 | * | 3/2001 | Nguyen et al. | 704/255 |
| 6,230,138 B1 | | 5/2001 | Everhart | |
| 6,374,221 B1 | * | 4/2002 | Haimi-Cohen | 704/256 |
| 6,377,924 B1 | * | 4/2002 | Gong et al. | 704/256 |

OTHER PUBLICATIONS

Nguyen et al. "N–Best Based Supervised and Unsupervised Adaptation for Native and Non–Native Speakers in Cars" pp. 173–176.*

* cited by examiner

*Primary Examiner*—Daniel Abebe
(74) *Attorney, Agent, or Firm*—Frank Lollo

(57) ABSTRACT

Disclosed herein is a method of improving the recognition accuracy of an in-vehicle speech recognition system. The method of the present invention selectively adapts the system's speech engine to a speaker's voice characteristics using an N-best matching technique. In this method, the speech recognition system receives and processes a spoken utterance relating to a car command and having particular speaker-dependent speech characteristics so as to select a set of N-best voice commands matching the spoken utterance. Upon receiving a training mode input from the speaker, the system outputs the N-best command set to the speaker who selects the correct car command. The system then adapts the speech engine to recognize a spoken utterance having the received speech characteristics as the user-selected car command.

11 Claims, 4 Drawing Sheets

FIG. 1
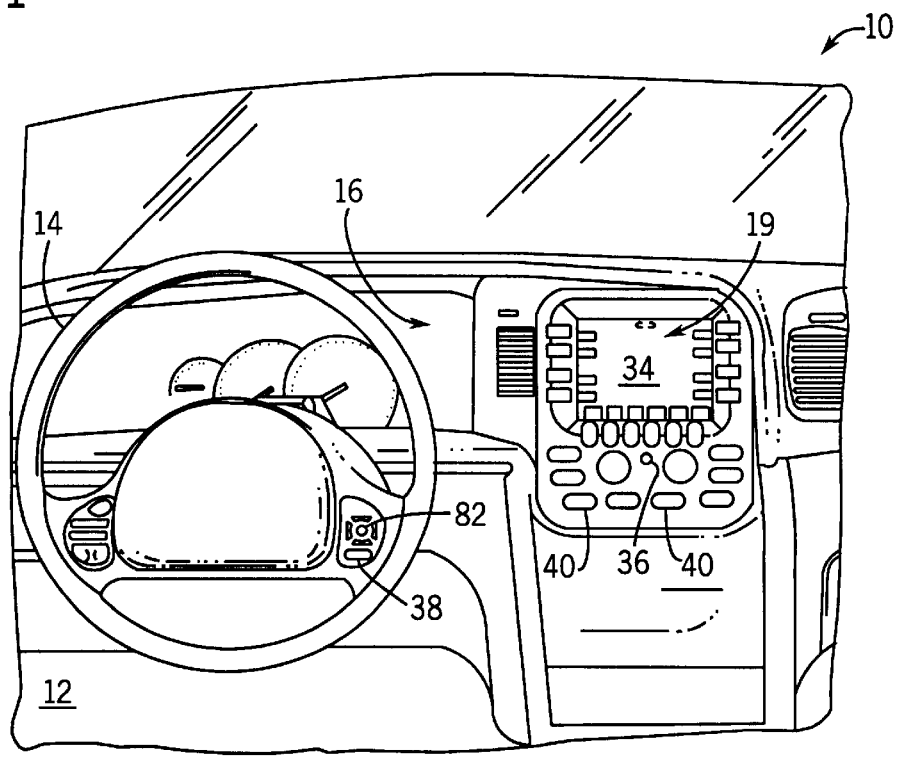
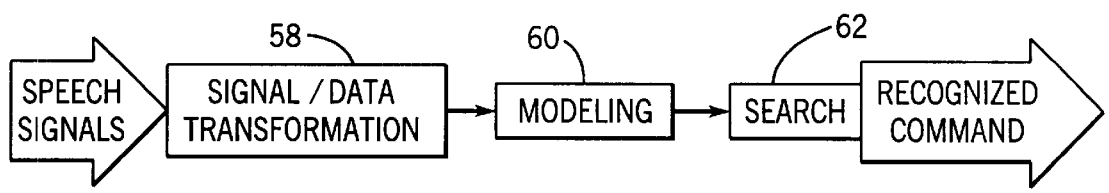
FIG. 3

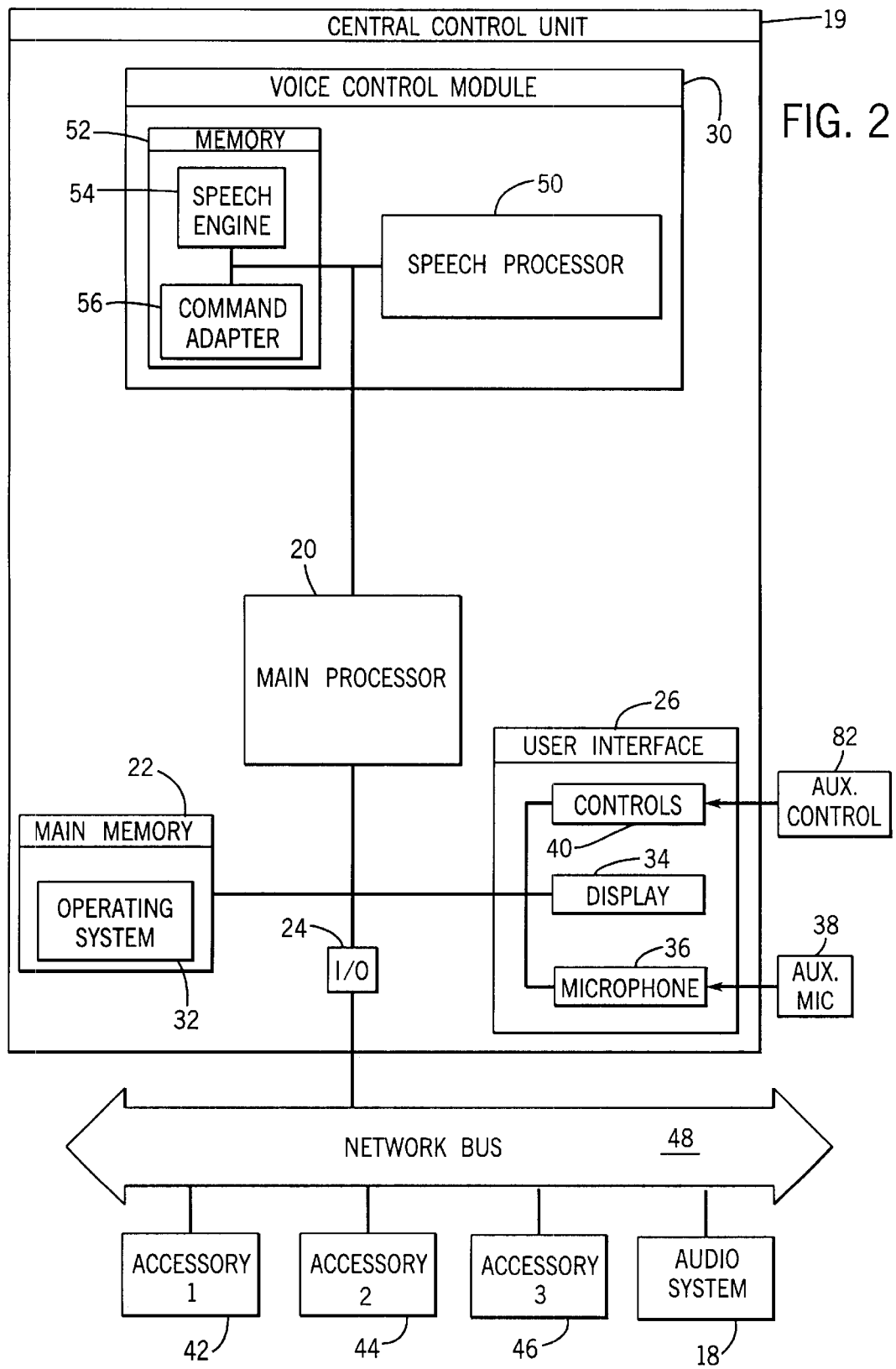

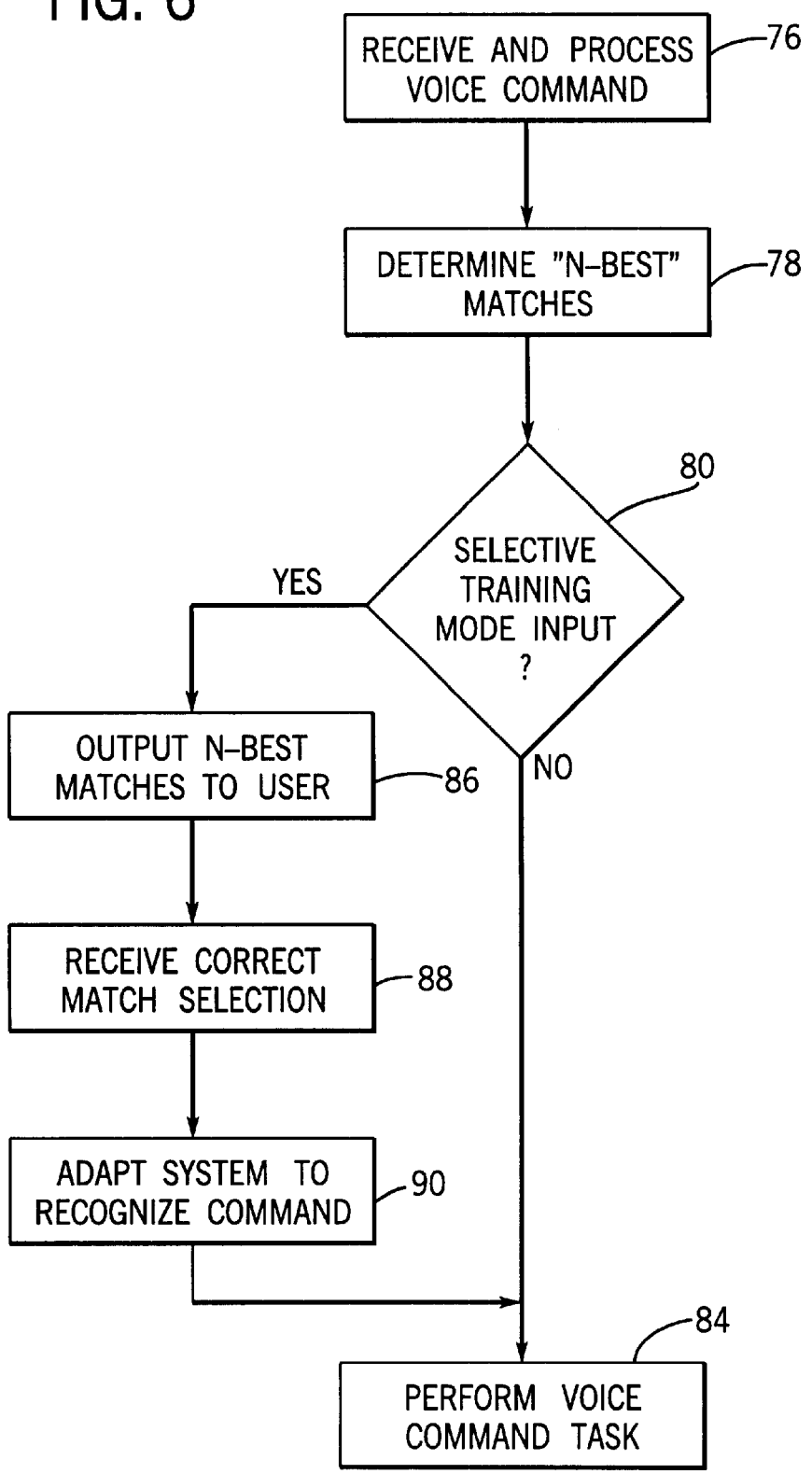

SELECTIVE SPEAKER ADAPTATION FOR AN IN-VEHICLE SPEECH RECOGNITION SYSTEM

CROSS-REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

1. Technical Field

The present invention relates to speech recognition systems, and in particular, to a method for selectively training in-vehicle speech recognition systems to adapt to the speech characteristics of individual speakers.

2. Description of the Related Art

Speech recognition systems on board automobiles permit drivers and passengers to control various vehicle functions by speaking words and phrases corresponding to voice commands. One or more microphones placed within the passenger cabin receive audio signals representing the spoken words and phrases. Speech engine recognition algorithms employing various acoustic and language modeling techniques are used to process the audio signals and identify a matching voice command contained in one or more stored command grammar sets. The voice command is then transmitted to a suitable control for operating any number of vehicle functions and accessories, such as power windows, locks and climate control devices.

The efficacy of any speech recognition system is largely measured in terms of recognition accuracy, i.e., whether the system correctly matches a voice command to a spoken utterance. Generally, speech recognition is a difficult problem due to the wide variety of speech/phonetic characteristics, such as pronunciations, dialect and diction, of individual speakers. This is especially true for in-vehicle speech recognition systems since vehicles typically carry a number of passengers. Moreover, the acoustic properties within the vehicle cabin can vary due to engine and road noises, for example, from passing traffic and sirens as well as weather conditions such as wind rain and thunder, which makes speech recognition particularly challenging.

Acoustic, lexical and language models are typically included in speech engines to aid in the recognition process by reducing the search space of possible words and to resolve ambiguities between similar sounding words and phrases. These models tend to be statistically based systems and can be provided in a variety of forms. Acoustic models may include acoustic signatures or waveform models of the audio signals corresponding to each command. Lexical and language models typically include algorithms instructing the speech engine as to the command word choice and grammatical structure. For example, a simple language model can be specified as a finite state network, where the permissible words following each word are given explicitly. However, more sophisticated, context specific language models also exist.

To improve recognition accuracy, conventional in-vehicle speech recognition systems permit these models to be adapted to a speaker's phonetic characteristics by performing a training routine. Typically, such training routines begin with the speaker directing the system to enter a training mode. The system prompts the speaker with a number of predetermined or random voice commands and instructs the speaker to say each command. The system then adapts the entire set of speech commands according to the variance of the spoken words from the models for the corresponding speech commands. Since the entire set of speech commands are being adapted, however, a high number of iterations are required in order to provide the system an adequate sampling of the speaker's speech characteristics. Typically, such training routines include at least 20–40 command prompt and response iterations.

This technique can be inconvenient and time consuming for the user due to the numerous training command input iterations. The training routine can be particularly distracting to a driver, such that it may be inappropriate for a driver to perform the routine while the vehicle is in motion. Moreover, the above technique can be ineffective for correcting particularly problematic words that are repeatedly mis-recognized. This is because the technique is designed to broadly tune the speech recognition system to a given speaker's phonetic characteristics.

Accordingly, there is a need for a simple and effective technique for adapting an in-vehicle speech recognition system to correct incorrectly recognized voice commands.

SUMMARY OF THE INVENTION

The present invention provides a method for improving the recognition accuracy of an in-vehicle speech recognition system by adapting its speech engine to a speaker's speech characteristics as needed to recognize a particular voice command and target specific problematic words or phrases. The method employs an N-best matching technique to provide a list of known car commands that most closely match a spoken utterance. When the speaker selects the intended or correct car command from the N-best matches, the spoken utterance is used to adapt the speech engine as needed to automatically recognize this car command.

Specifically, the present invention is a method for the selective speaker adaptation of an in-vehicle speech recognition system used to operate vehicle accessories by voice. The method includes the steps of: receiving from a speaker a spoken utterance having speaker-dependent speech characteristics and relating to one of a set of known car commands; processing the spoken utterance according to a recognition parameter; identifying an N-best set of known car commands matching the processed spoken utterance; outputting the N-best command set to the speaker; receiving speaker input selecting a correct car command from the N-best command set; and adjusting the recognition parameter so that the speech recognition system adapts to the speaker by recognizing as the correct car command a spoken utterance having the speech characteristics of the spoken utterance. The method further includes performing an accessory operation corresponding to the correct car command.

In one aspect of the present invention, the recognition parameter is an acoustic waveform model and the spoken utterance speech characteristics include a speaker-dependent acoustic signature. In this case, the speech engine is adapted by substituting the acoustic signature for the waveform model of the correct car command. Alternatively, the recognition parameter is a phonetic classification set and the speech engine is adapted by altering the phonetic classification set according to the spoken utterance speech characteristics for the correct car command.

In another aspect of the invention, the N-best command set may be displayed on an instrument panel display and the speaker selection input is via an input device. Alternatively, the N-best command set may be output audibly via a loudspeaker, such as in a vehicle audio system, by processing text-to-speech algorithms and/or pre-recorded speech files. In this case, the audible output includes identifiers for each N-best command that the speaker may utter as speaker selection input.

In yet another aspect, the method can include receiving a training mode input from said speaker, such that the outputting, selecting and adapting steps are only performed upon receiving the training mode input. The training mode input can be performed in a variety of ways, including operating a training mode control button and issuing a training mode voice command. The training mode voice command can be a dedicated word or phrase, such as "train" or "learn word". Or, it may any spoken utterance in which the accessory operation corresponding to the spoken command as recognized by the speech engine has already been performed. For example, if the speech engine recognizes a spoken phrase as "dome light on" when the dome light is already on, it can interpret this as a mis-recognition error and enter the training mode. Moreover, the training mode input can be a spoken utterance repeated in succession, such as "dome light on . . . dome light on". Repeated phases could be deemed training mode input for only selected voice commands that are not typically issued in succession and/or only when the expected accessory operation has already been performed.

In still another aspect, the method of the present invention can include assigning a match probability weighting to each of the known car commands in the N-best command set. Preferably, one of the N-best car commands has a highest match probability weighting, in which case, the adaptation is performed only if the speaker does not select the highest match probability command as the correct car command.

Thus, the present invention provides a simple and quick method of selectively adapting a speech engine to recognize a particular voice command according to the speech characteristics of the speaker. By adapting the speech engine according to the correlation of the spoken utterance to the intended or correct voice command, this method permits the speaker to correct the misrecognition of specific voice commands. Moreover, since it adapts the speech engine to an already spoken utterance, this method can eliminate the need for a lengthy, iterative training routine requiring the speaker to respond to a number of training command prompts.

These and still other advantages of the present invention will be apparent from the description of the preferred embodiments which follow.

BRIEF DESCRIPTION OF THE DRAWINGS

FIG. 1 is a partial front view of an instrumental panel of an automobile having a speech recognition system for controlling vehicle accessories;

FIG. 2 is a block diagram of the in-vehicle speech recognition system of FIG. 1 in which the method of selective speaker adaptation of the present invention can be utilized;

FIG. 3 is a block diagram of a speech engine architecture for use in the speech recognition system of FIG. 2.

FIG. 6 is a flow chart of a preferred technique for carrying out the selective speaker adaptation method of the present invention.

DETAILED DESCRIPTION OF THE PREFERRED EMBODIMENTS

Figure 4:
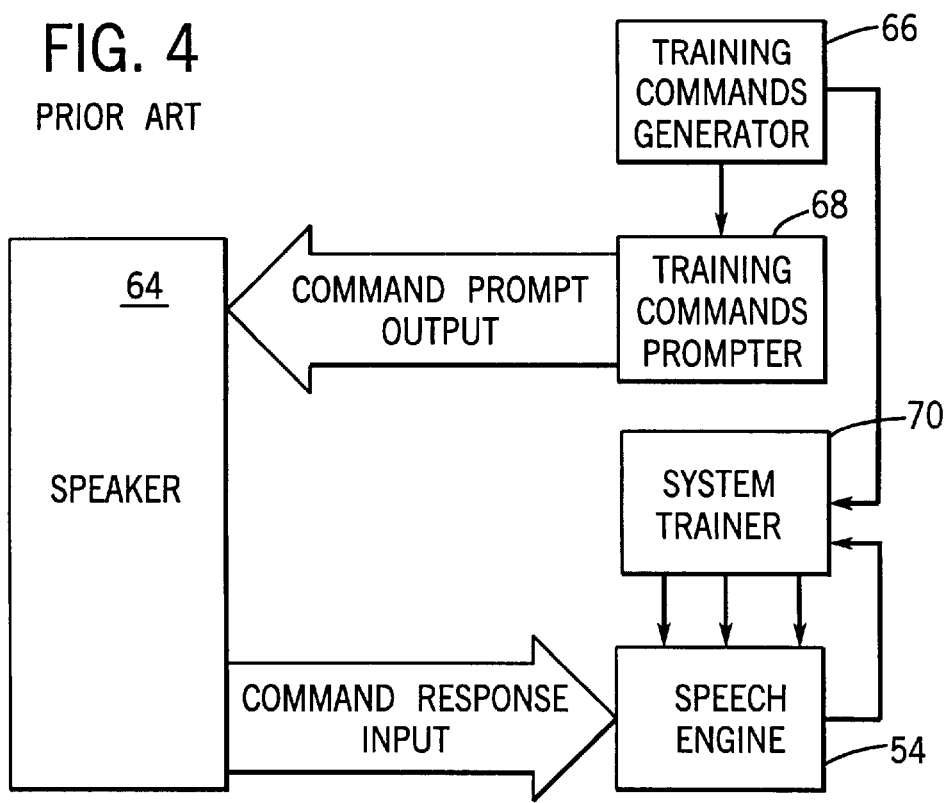
FIG. 4 is a block diagram of a prior art method of adapting a speech engine according to an iterative training procedure in which the speaker is prompted multiple times to speak randomly generated or prescribed voice commands.

Referring to FIG. 1, an automobile 10 includes a passenger cabin 12 having a steering wheel 14, an instrument panel/dashboard 16 and an audio system 18 (see FIG. 2) having a player and speakers (not shown). Referring to FIGS. 1 and 2, the instrument panel 16 preferably includes a central control unit 19 having a main processor 20, main memory 22, input/output (I/O) module 24, user interface 26 and a voice control system (VCS) module 30. The central control unit 19 is preferably in a suitable location for operation by a driver and front passenger (not shown). The main memory 22, preferably a suitable silicon chip, includes programming providing an operating system 32 for controlling operation of the main processor 20 and processes of the other components of the central control unit 19. This main processor 20 can be any suitable microprocessing chip known in the art.

The user interface 26 includes a display 34 and a microphone 36. Additional auxiliary microphones 38 may also be disposed at various places in the passenger cabin to better receive commands from vehicle occupants seated at various locations in the cabin. For example, an auxiliary microphone 38 (FIG. 1) can be mounted to the steering wheel 14 as well as front and rear passenger arm rests (not shown).

The user interface 26 also includes control buttons 40, including for operation of vehicle accessories, such as accessories 42, 44, 46. These control buttons 40 can be multi-function buttons that may be reconfigured or reprogrammed to perform various control operations. For example, auxiliary control 82 may be used as a training mode input device as will be described. The user interface 26 is coupled to the vehicle accessories, preferably via the I/O module 24 and a vehicle network bus 48. The user interface 26 permits adjustment of all controllable function parameters associated with each accessory. The vehicle accessories can be any powered devices, such as a climate control, a clock, interior or exterior lights, the audio system 18, rear view mirrors, door locks, seat and window controls and a navigation system.

The user 26 interface is coupled to the main processor 20 for receiving audio signals via the microphone 36 and control signals from the control buttons 40 as well as for sending display and audio signals to the user. It should be noted that although FIG. 2 shows the user 26 interface and the VCS module 30 as being a part of the central control unit 19, these components could all be separate devices coupled directly or via the vehicle network bus 48.

The VCS module 30 includes a speech processor 50 and a memory 52. The speech processor 50 can be any of a number of suitable microprocessing chips and the memory 52 can be any suitable electronic storage device. Stored within the VCS memory 52 is software programming providing a speech engine 54 and an adapter 56 suitable for performing the method of the present invention. The speech engine 54 includes one or more command and control grammar (CCG) sets. The CCG sets contain the list of known car-related voice commands for controlling vehicle accessory functions. Thus, for example, the CCG sets can include commands executable by the navigation unit for accessing various navigation menus pertaining to map guidance, destination entry, display commands and navigation set-up. Additionally, the commands can be synthesized voice messages processed according to text-to-speech algorithms and sent to the vehicle audio system 18 for providing audible feedback to occupants about the functions or states of the accessories being controlled. Alternatively, pre-recorded speech files can be processed and output audibly for user feedback.

One or more of multiple CCG sets containing different sets of commands can be made active so that different accessories or accessory functions can be voice activated by various vehicle occupants. For example, a driver CCG set can be made active that has a rear view mirror adjust command allowing the driver to adjust the rear view mirrors, while an active passenger grammar set may not contain such a command.

Any of a number of different types of grammar structures known in the art may be used. For example, the voice commands may include key terms, which identify a parameter for adjustment, such as temperature, volume, speed, and window and seat position. Alternatively, the voice commands may be organized in a menu system such that the voice commands are in terms of the accessory to be controlled followed by a function parameter. An example of this distinction is in a key word driven system, an exemplary voice command for lowering a window is, "lower window", while a corresponding voice command in a menu driven system is "window-down". The present invention can be utilized to organize and recognize voice commands in either, both or other known voice command structures.

One embodiment of a speech engine architecture usable with the present invention will be described. Generally, the speech engine 54 employs voice recognition techniques to recognize spoken sounds and transmit corresponding commands to controls for voice activated vehicle accessories, such as accessories 42, 44, and 46. The speech processor 50 receives digitized audio signals from the microphone 36. Under the control of the speech engine 54, the speech processor 50 analyzes the digitized speech signals using the speech engine recognition algorithms to identify a corresponding voice command contained in the active grammar set.

More specifically, referring to FIG. 3, at signal/data transformation block 58, the speech processor uses the recognition algorithms to convert the digitized speech signals into an alternate form, such as one indicating spectral characteristics. The signal/data transformation block 58 produces a new representation of the speech signals that can then be used in subsequent stages of the voice recognition process. In modeling block 60, modeling algorithms are used to process the speech signals further by applying speaker-independent acoustic models, as well as other known lexical and language models, to the signals. Finally, in search block 62, search algorithms are used to guide the speech processor 50 to the most likely command corresponding to the speech signals. The search algorithms can identify a single best matching command or a set of N-best matching commands of the CCG set. Using the N-best technique, a set of the most likely commands is created, each preferably being assigned a match probability weighting.

Referring again to FIG. 2, once the matching command is identified, the processors 20, 50 then output the command, via the I/O module 24, to the relevant accessory which performs the desired task. As one example, the above process can be used to control a voice activated climate control system by the driver issuing a voice command such as "temperature up" to increase the cabin temperature.

The speech processor 50 can perform this process automatically when a speaker, driver or passenger, says a voice command. Alternatively, in order for an accessory to be activated by voice, the operating system 32 can be programmed to require that the speech processor 50 receive a talk control signal from a control button 40 via the user interface 26, invoking a "listen" period in which the audio signals are received and then processed. In either case, under normal operation, the speech engine adapter 56 is inactive until a training mode input is received.

According to typical prior art techniques, such as that shown in FIG. 4, a training mode input by a speaker 64 initiates a stored training routine for adapting the entire speech engine 54 to the speech characteristics of the speaker 64. Referring to FIG. 4, the training routine begins with a training command generator 66 selecting known commands for use in training the speech engine 54. The commands can be randomly generated or of a prescribed set of commands which provide a representative sampling of the phonetic makeup of the one or more active grammar sets. A training command prompter 68 receives the first generated command and outputs the command to the speaker 64, prompting the speaker 64 to say the generated command. The command can be output to the speaker 64 audibly via a loud speaker such that of the vehicle's audio system 18 using text-to-speech algorithms or pre-recorded speech files, as known in the art, of the speech engine 54, or visually using the display 34. In response to the command prompt, the speaker 64 enunciates the command, which is received and processed using the speech engine 54. This process is repeated for a number of iterations, typically 20–40 times, depending largely upon the quantity and phonetic disparity of the known voice commands in the active grammar(s). For each new training command, the speaker 64 is prompting to parrot the command audibly. When each generated training command has been received and processed, a system trainer 70 adjusts the entire set of acoustic models and other known recognition parameters as needed according to the unique speech characteristics of the speaker 64, using the correlation of each training command to the acoustic and phonetic characteristics of each of the speaker's 64 responses. This multiple iterative process can be quite lengthy, often up to 20 minutes, and requires a great deal of the speaker's 64 attention. As such, it is not well suited for use by the driver of the automobile 10.

Figure 5:
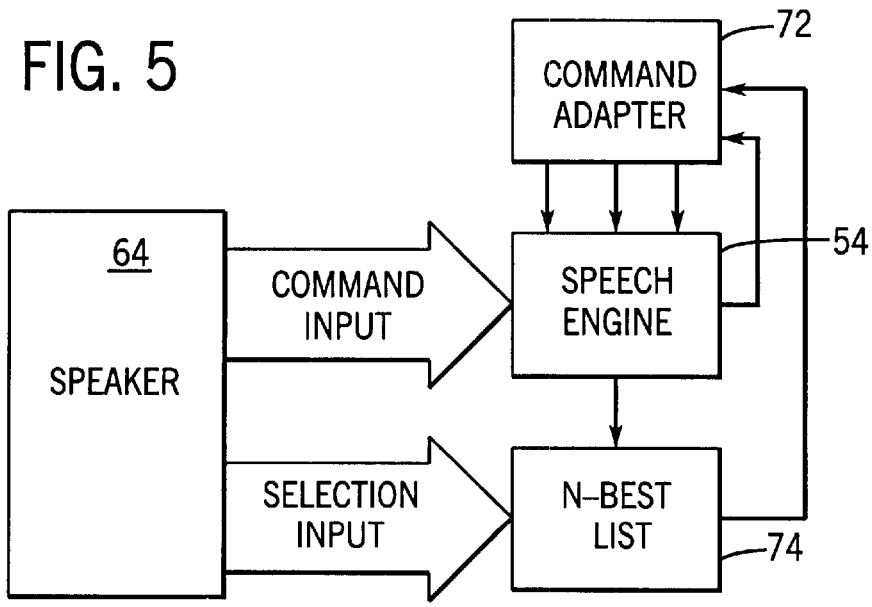
FIG. 5 is a block diagram of the method of selectively adapting a speech engine by a speaker speaking a phrase and selecting the intended command from a list of N-best matching commands.

According to the present invention, a simple and quick method of selectively adapting the speech engine 54 to recognize a particular voice command according to the speech characteristics of a particular speaker 64 is shown in the block diagram of FIG. 5. As illustrated therein, the speech engine 54 is adapted by a command adapter 72 using the correlation of audio signals representing the speaker's command input and the selection of the N-best matches list 74. As can be seen, this method eliminates the need for a separate training routine, requiring the speaker to respond to a number of training command prompts. Moreover, this method includes the "command adapter" having adaptation algorithms designed to adapt the speech engine 54 to the speech characteristics of the speaker 64 only for a particular command. In contrast, the prior art method of FIG. 4 uses the system trainer 70 algorithms to modify the entire set of speech engine recognition parameters to adapt to the speaker's speech characteristics. Thus, where the prior art method provides an adaptation of the entire speech engine 54, the method of the present invention is a speaker-selected adaptation of a particular voice command. The prior art method generally adapts the speech engine 54 to the speech characteristics of the speaker 64, while the present invention permits the speaker 64 to correct specific mis-recognized voice commands, which may remain unrecognized under the prior art method. It should be noted, that the present invention can be used to provide fine tuning of the coarse adjustment to the speech engine 54 as provided in the above described prior art method.

Referring to FIGS. 2 and 6, a preferred method of performing the selective adaptation process of the present invention is given. At step 76, the speech processor 50 receives and processes the audio signals representing the spoken voice command. Then, at step 78, the speech engine 54 uses the described speech recognition techniques to compile a set of voice commands from the active CCG set that best match the audio signals, i.e., the N-best matches.

The speech processor 50 then checks for a training mode input from the speaker, at decision block 80. This step could be performed before the step 78 so that an N-best list is generated only if the speaker wishes to adapt the speech engine 54. As mentioned, however, speech engine recognition algorithms often include the N-best technique as part of ascertaining the matching command, in which case this step is performed under normal operation without additional processing.

The training mode input can be performed in a variety of ways, including operating a training mode control button 82 (FIG. 1) and issuing a training mode voice command. The training mode voice command can be a dedicated word or phrase, such as "train" or "learn word". Or, it may any spoken utterance in which the accessory operation corresponding to the spoken command as recognized by the speech engine 54 has already been performed. For example, if the speech engine 54 recognizes a spoken phrase as "dome light on" when the dome light is already on, it can interpret this as a misrecognition error and enter the training mode. Moreover, the training mode input can be a spoken utterance repeated in succession, such as "dome light on . . . dome light on". Repeated phases could be deemed training mode input for only selected voice commands that are not typically issued in succession and/or only when the expected accessory operation has already been performed.

Preferably, if no training mode request is input, the processors 20, 50 output the matching voice command to the relevant accessory via the I/O module 24, which activates the accessory as needed to perform the corresponding task, at step 84. If a training mode request is input, the processors 20, 50 output the N-best matches list to the user interface 26, at step 86. The N-best matches list can be presented to the speaker audibly via the vehicle's audio system 18, or visually on the display 34. In either case, the speaker will be prompted to select one of the listed N-best matches as the being the intended voice command.

It is possible that the speech engine 54 will not identify in the N-best matches list the voice command that the speaker intended to execute. In this case, in step 86, the user can be prompted, visually or audibly, to re-speak the command. Additionally, or alternatively, the speaker can be prompted to select the command from a list of all voice commands in the active or any CCG set.

At step 88, the speaker selects the intended voice command. The input can be a contact input via one of the control buttons 40 or a speech input. Preferably, a speech input would include speaking a selection identifier that is assigned to each command in the N-best matches list. For example, the user could be prompted to say "one" or "a" to select as the intended command the first listed matching command and "two" or "b" for the second listed command, and so on.

Preferably, once the speaker selects a command from the N-best matches list, the processor 20 can determine whether the selected command has the highest match probability weighting. If so, the speech engine 54 correctly recognized the spoken command and no adaptation occurs. Otherwise at step 90, the adaptation algorithms are executed using the correlation of the audio signals received in step 76 to the selected command. The adaptation algorithms modify the speech engine 54 to recognize as the selected command audio signals having the speech patterns and phonetic characteristics of that received at step 76. This can be accomplished using adaptation algorithms in which recognition parameters of the speech engine models are modified. These parameters can include acoustic waveform models stored in the VCS memory 52 for each known voice command and the adaptation algorithms can replace the model active for the relevant command with the acoustic signature of the speech signals received in step 76. Alternatively, the recognition parameters can include a phonetic classification set for the relevant command that is modified according to the speech signals received in step 76.

Finally, at step 84, the processors 20, 50 output the selected command to the relevant accessory and the task is performed.

The present invention may include other aspects not specifically delineated in the aforementioned preferred embodiments. The above in no way is intended to limit the scope of the invention. Accordingly, in order to apprise the public of the full scope of the present invention, reference must be made to the following claims.

We claim:

1. A method for speaker adaptation of selected car commands in an in-vehicle speech command system for operating vehicle accessories by voice in moving and non-moving vehicles, comprising the steps of:

(A) receiving from a speaker a spoken utterance having speaker-dependent speech characteristics corresponding to one of a set of known car commands for operating one of said vehicle accessories;

(B) processing said spoken car command utterance according to a recognition parameter;

(C) identifying an N-best set of known car commands matching said spoken car command utterance;

(D) identifying whether said spoken car command utterance presents a training mode input by evaluating the state of said vehicle accessories during which said spoken car command utterance is spoken;

(E) outputting said N-best command set to said speaker only if said training mode input is identified;

(F) receiving speaker input selecting a correct car command from said N-best command set; and (G) adjusting said recognition parameter so that said speech command system adapts to said speaker by recognizing as said correct car command said spoken car command utterance having said speech characteristics.

2. The method of claim 1, wherein said recognition parameter is an acoustic waveform model and wherein said spoken utterance speech characteristics include a speaker-dependent acoustic waveform signature, wherein said adapting step (G) further includes correlating said waveform signature to said acoustic waveform model for said correct car command.

3. The method of claim 1, wherein said recognition parameter is a phonetic classification set and said adapting step (G) includes altering said phonetic classification set for the correct command according to said spoken utterance.

4. The method of claim 1, wherein said step (E) includes displaying said N-best command set on a display.

5. The method of claim 1, wherein said step (E) includes processing said N-best command set and outputting said N-best command set audibly via a vehicle audio system.

6. The method of claim 5, wherein said audibly outputted N-best command set includes selection identifiers, and wherein said speaker selection input is spoken utterances containing said selection identifiers.

7. The method of claim 1, wherein said identifying step (C) includes assigning a match probability weighting to each of said known car commands in said N-best command set.

8. The method of claim 1, wherein one of said car commands in said N-best command set has a highest match probability weighting, and wherein said adapting step (G) is performed only if said speaker does not select said highest match probability command as said correct car command.

9. The method of claim 1, further comprising the step of:
performing an accessory operation corresponding to said correct car command.

10. The method of claim 1, wherein said N-best command set is comprised of at least three known car commands.

11. The method of claim 1, wherein said training mode input is selected from a group consisting of a repetitive spoken car command utterance and a spoken car command utterance corresponding to a car command for activating a vehicle accessory to be in its present state.

* * * * *